(12) United States Patent
Spacek et al.

(10) Patent No.: US 8,875,069 B1
(45) Date of Patent: Oct. 28, 2014

(54) SYSTEM AND METHOD FOR GENERATING CONSTRAINED RANDOM VALUES ASSOCIATED WITH AN ELECTRONIC DESIGN

(71) Applicant: Cadence Design Systems, Inc., San Jose, CA (US)

(72) Inventors: Petr William Spacek, Princeton, MA (US); Prasanna Prithviraj Rao, Boston, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/749,133

(22) Filed: Jan. 24, 2013

(51) Int. Cl.
*G06F 17/50* (2006.01)

(52) U.S. Cl.
CPC .................................. *G06F 17/5045* (2013.01)
USPC .......................................................... 716/101

(58) Field of Classification Search
USPC .......................................................... 716/101
See application file for complete search history.

(56) References Cited

U.S. PATENT DOCUMENTS

| | | | | |
|---|---|---|---|---|
| 6,195,672 B1 * | 2/2001 | Gouger et al. | ................ | 708/204 |
| 2004/0233191 A1 * | 11/2004 | Mukherjee et al. | ........... | 345/419 |
| 2013/0142301 A1 * | 6/2013 | Frazier et al. | ................... | 377/33 |

\* cited by examiner

*Primary Examiner* — Vuthe Siek
*Assistant Examiner* — Mohammed Alam
(74) *Attorney, Agent, or Firm* — Holland & Knight LLP; Mark H. Whittenberger, Esq.

(57) ABSTRACT

The present disclosure relates to a computer-implemented method for electronic design verification. The method may include providing, using one or more processors, an electronic design having at least one floating point variable associated therewith. The method may further include converting the at least one floating point variable of the electronic design to a fixed point variable to generate a fixed point implementation of the electronic design. The method may also include processing, using a formal engine, the fixed point implementation of the electronic design.

18 Claims, 2 Drawing Sheets

SYSTEM AND METHOD FOR GENERATING CONSTRAINED RANDOM VALUES ASSOCIATED WITH AN ELECTRONIC DESIGN

FIELD OF THE INVENTION

The present disclosure relates to electronic design automation, and more specifically, to a method for generating constrained random values associated with an electronic design verification.

DISCUSSION OF THE RELATED ART

Electronic design automation (EDA) utilizes software tools that may be used in the design and analysis of numerous electronic systems such as printed circuit boards (PCBs) and integrated circuits (ICs). Verification environments include constraints that describe the relationship between the variables that control the simulation (and sometimes the data that is used as well). Formal engines such as Boolean satisfiability (SAT) and Binary Decision Diagram (BDD) engines are often used in hardware verification problems, however, floating-point hardware is far more complex than integral hardware, and the analogous Boolean representations for the formal engines are extremely difficult to implement and/or debug.

SUMMARY OF INVENTION

In one or more embodiments of the present disclosure, a computer-implemented method for use in electronic design verification is provided. The method may include providing, using one or more processors, an electronic design having at least one floating point variable associated therewith. The method may further include converting the at least one floating point variable of the electronic design to a fixed point variable to generate a fixed point implementation of the electronic design. The method may also include processing, using a formal engine, the fixed point implementation of the electronic design.

One or more of the following features may be included. In some embodiments, the formal engine may be a Boolean satisfiability (SAT) engine. In some embodiments, the formal engine may be a Binary Decision Diagram (BDD) engine. The method may further include converting at least one integer variable to an integer-converted fixed point variable. In some embodiments, the fixed point implementation may include the integer-converted fixed point variable. In some embodiments, the fixed-point implementation may be user-configurable. The method may also include automatically adjusting the fixed-point implementation based upon, at least in part, the at least one floating point variable.

In some embodiments, a computer-readable storage medium for electronic design verification is provided. The computer-readable storage medium may have stored thereon instructions that when executed by a machine result in one or more operations. Operations may include providing, using one or more processors, an electronic design having at least one floating point variable associated therewith. Operations may further include converting the at least one floating point variable of the electronic design to a fixed point variable to generate a fixed point implementation of the electronic design. Operations may also include processing, using a formal engine, the fixed point implementation of the electronic design.

One or more of the following features may be included. In some embodiments, the formal engine may be a Boolean satisfiability (SAT) engine. In some embodiments, the formal engine may be a Binary Decision Diagram (BDD) engine. Operations may further include converting at least one integer variable to an integer-converted fixed point variable. In some embodiments, the fixed point implementation may include the integer-converted fixed point variable. In some embodiments, the fixed-point implementation may be user-configurable. Operations may also include automatically adjusting the fixed-point implementation based upon, at least in part, the at least one floating point variable.

In one or more embodiments of the present disclosure, a system may include a computing device having at least one processor configured to receive an electronic design having at least one floating point variable associated therewith. The one or more processors may be further configured to convert the at least one floating point variable of the electronic design to a fixed point variable to generate a fixed point implementation of the electronic design. The one or more processors may be further configured to process, using a formal engine, the fixed point implementation of the electronic design.

One or more of the following features may be included. In some embodiments, the formal engine may be a Boolean satisfiability (SAT) engine. In some embodiments, the formal engine may be a Binary Decision Diagram (BDD) engine. The one or more processors may be further configured to convert at least one integer variable to an integer-converted fixed point variable. In some embodiments, the fixed point implementation may include the integer-converted fixed point variable. In some embodiments, the fixed-point implementation may be user-configurable. The one or more processors may be further configured to automatically adjust the fixed-point implementation based upon, at least in part, the at least one floating point variable.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
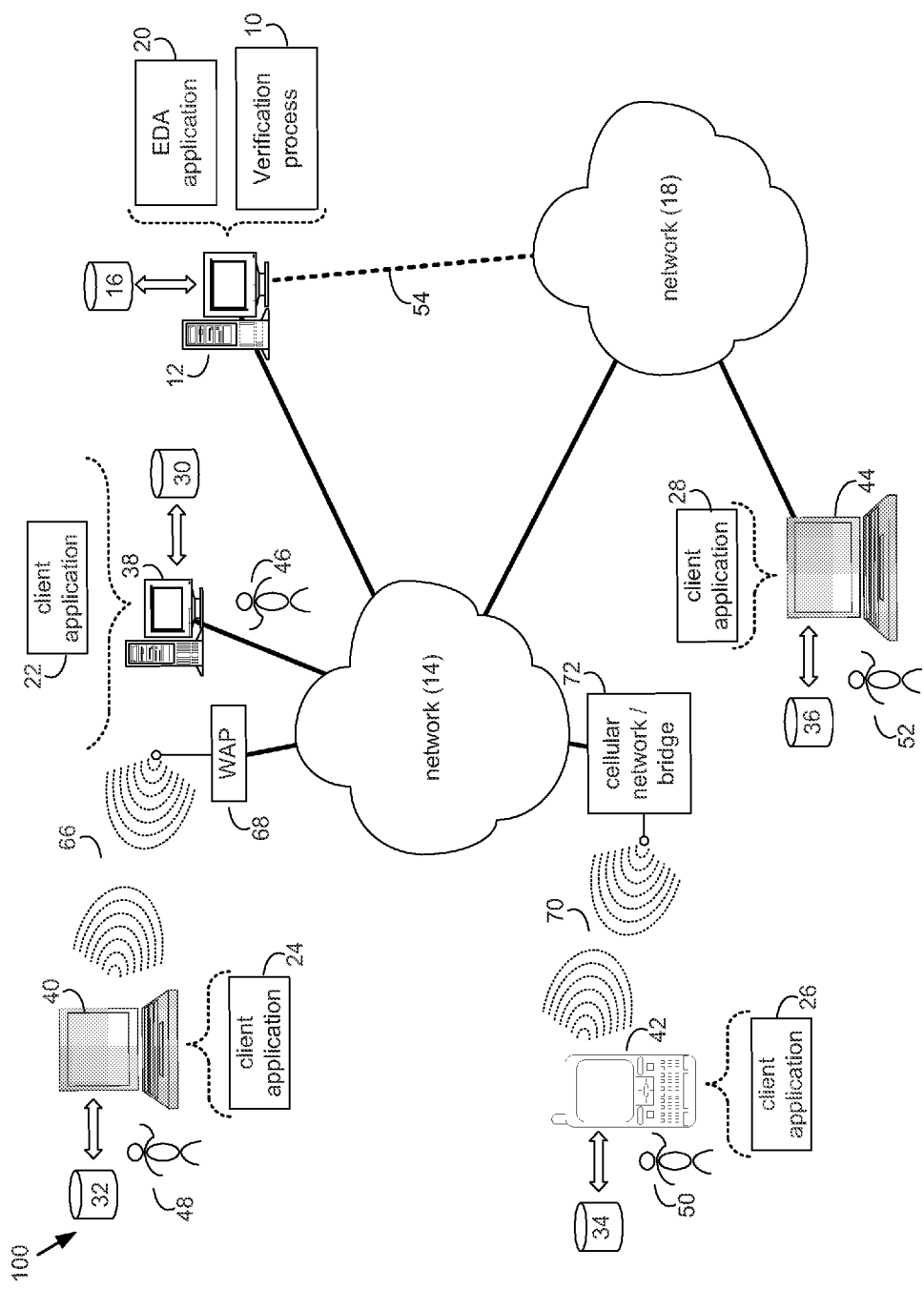
FIG. 1 is a system diagram depicting aspects of the verification process in accordance with an embodiment of the present disclosure.

As discussed above, verification environments may include constraints to describe the relationship between the variables that control the simulation (and sometimes the data that is used as well). Many constrained random verification environments may exhibit a number of problems. Some of these may include, but are not limited to, expected values are not reached, the values are chosen less frequently or more frequently than expected, the constraint solver calls take too long to finish, the solver is unable to find a solution for a given constraint set, the solver is unable to find a solution with certain starting conditions including variables that are not random or handles and arrays that are not initialized, the solver runs out of memory, etc. Typical constrained random verification environments use many randomized (constraint solver) calls to determine the configuration of the design being verified and the data used to verify the chosen configuration.

Additionally, time based breakpoint or single stepping techniques for resolving coding mistakes may not work well for solving constraint issues. Many constraint solver calls happen in the same simulator time step. They may also occur before any simulation time has been consumed. The same randomized call may also be called thousands of times in the same simulation, each time with a different seed or different state variables.

Some constraints (e.g. SystemVerilog) may be expressed in a declarative, not procedural way. Variables related to each other by constraint operators must be solved so that a uniform distribution in the solution space is provided. This usually means that the related variables (known as a variable partition) are solved concurrently. Resolving constraint solver issues presents a unique challenge because of this concurrent processing. A single randomized call may also be broken down by the constraint solver engine into many layers for a variety of reasons, including, but not limited to, the partitioning of variables, solve before constraints, function calls in the constraints, etc. The manner in which the solving process is broken into steps is often not obvious, further complicating the analysis process.

Constrained-random stimulus for hardware verification usually combines multiple variables in arithmetic and logic expressions, defining a space of possible sets-of-values, called a solution space. The goal of the generator is to choose values from this solution space in a uniform value, "solving" for all of the variables simultaneously. An example from SystemVerilog (SV) may look like:
rand bit[2:0] command;
rand bit[31:0] address;
constraint c1 {(command==0)→(address>=0 && address<100;)}
constraint c2 {(command==1||command==2)→(address<1000;)}

One method of generating these values is through the use of formal engines, such as BDD and SAT discussed above. These engines may be configured to operate on Boolean expressions, similarly to the way hardware operates on Boolean values. In order to use these formal engines, each bit of each variable may be assigned to a unique engine variable, and the expressions may be Booleanized, or converted to Boolean equivalents. This is somewhat analogous to building digital hardware which may represent the constraint expressions.

Customers increasingly want to generate random values of analog variables, under the control of digital variables, in a mixed-signal environment:
rand bit[2:0] phase;
rand real voltage;
constraint c1 {(phase==0)→(voltage>2.0 && voltage<5.0;)}
constraint c2 {(phase==1)→(voltage>-8.0 && voltage<-3.0;)}

In this situation it may be far more difficult to use the formal engines to solve for the two variables at the same time. Floating-point hardware is much more complex than integral hardware, and the analogous Boolean representations for the formal engines would be difficult to implement and debug.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the report generation process may reside on and be executed, in whole or in part, by a client electronic device, such as a personal computer, notebook computer, personal digital assistant, or the like.

The instruction sets and subroutines of verification process 10 may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

Accordingly, EDA application 20 may be configured to fuel testbench automation, analysis, and reuse for increased productivity. EDA application 20 may be configured to ensure verification quality by tracking industry-standard coverage metrics, including functional, transactional, low-power, and HDL code, plus automatic data and assertion checking EDA application 20 may be configured to drive and/or guide verification with an automatically backannotated and executable verification plan. EDA application 20 may be configured to create reusable sequences and multi-channel virtual sequences on top of a multi-language verification environment and to configure existing Universal Verification Components (UVCs) or quickly constructs all-new UVCs. EDA application 20 may be configured to enable advanced debug for transaction-level models, SystemVerilog/e class libraries, transient mixed-signal, low-power, and traditional waveform analysis.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

In some embodiments, EDA application 20 may be configured to perform testbench automation, reuse, and analysis to verify designs from the system level, through RTL, to the gate level. EDA application 20 may support a metric-driven approach and may utilize a native-compiled architecture in order to speed the simultaneous simulation of transaction-level, behavioral, low-power, RTL, and gate-level models.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, the verification process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 and/or verification process 10 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
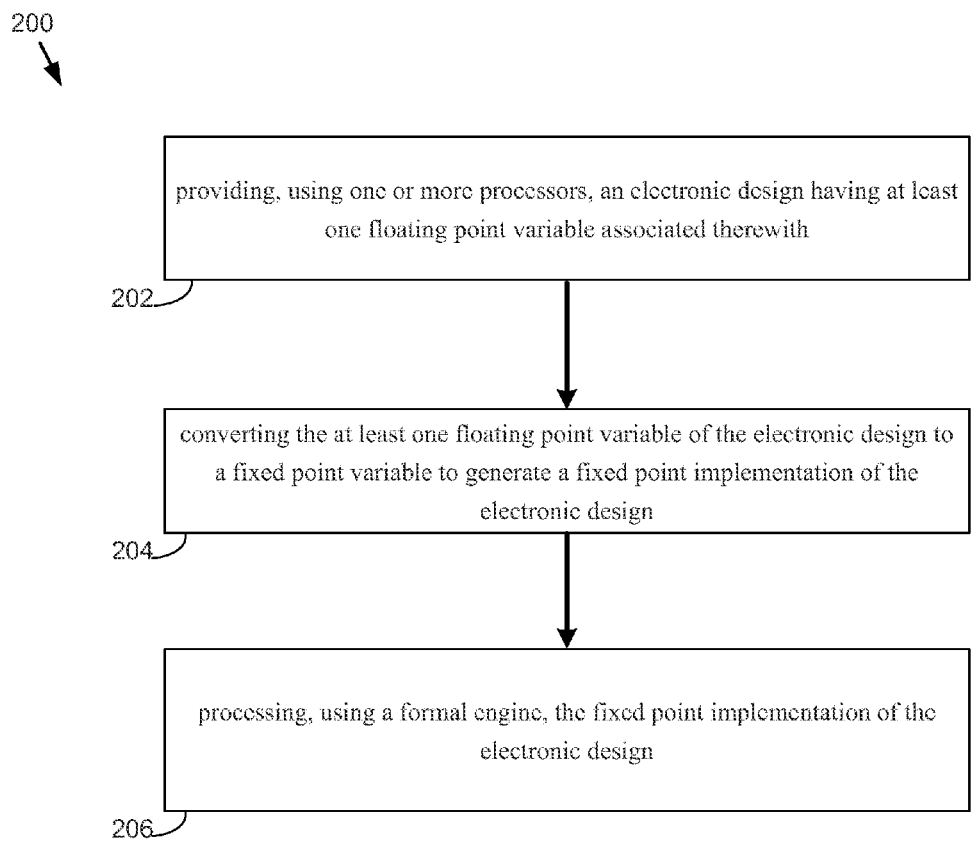
FIG. 2 is a flowchart depicting operations consistent with the verification process of the present disclosure.

As shown in FIG. 2, and as will be discussed in further detail below, verification process 10 may include providing (202), using one or more processors, an electronic design having at least one floating point variable associated therewith. Verification process 10 may further include converting (204) the at least one floating point variable of the electronic design to a fixed point variable to generate a fixed point implementation of the electronic design. Verification process 10 may also include processing (206), using a formal engine, the fixed point implementation of the electronic design.

Accordingly, some embodiments of the verification process described herein may be configured to utilize the existing Booleanized code and extend it to handle floating-point values and variables. This may be achieved through the use of a fixed-point representation. Once converted to fixed-point, both real values and variables can be treated as integers for most of the operations required. Some of these operations may include, but are not limited to, comparisons, addition, subtraction, multiplication, etc. Furthermore, in some embodiments, real variables may be combined with integral variables by converting the latter to the same fixed-point representation. In some embodiments, this may be achieved using a simple shift operation, however other approaches are also within the scope of the present disclosure. The fixed-point variables and expressions may then be Booleanized as well and processed by the same formal engines, thus requiring little or no changes to the Booleanization code or the engines. The resulting random values may then be converted back to real numbers and returned to the user.

One of the difficulties inherent in this approach is determining the most appropriate fixed-point format. For example, real variables in SystemVerilog may have a large possible range of values, as the exponent in a double-precision float is 11 bits wide. Accordingly, in order to represent all possible values in fixed-point would require a width of 2000+ bits.

In some embodiments, verification process 10 may utilize a 128 bit fixed-point format. This may accommodate real values roughly in the range of $1.0e-12 \rightarrow 1.0e+12$. If this is not enough for a particular application, the fixed-point implementation may be user-configurable, and a different width may be selected. It should be noted that the example of 128 bits is provided merely by way of example as numerous other formats may be used without departing from the scope of the present disclosure.

In some embodiments, verification process 10 may be extended to allow for a dynamic fixed-point implementation.

For example, where the current width of the representation automatically adjusts depending on the variables and constants in use.

Additionally and/or alternatively, verification process 10 may be configured to address issues related to overflow/underflow conditions. For example, if a computation results in a value which does not fit in the limited fixed-point representation, care must be taken to avoid a zero result. This may be achieved through the use of additional checks during the Booleanization process, forcing a minimal non-zero value where necessary.

Embodiments of verification process 10 described herein may allow for combining both real and integer variables/values in a variety of different situations. Some of these may include, but are not limited to, lists of related Boolean expressions, arithmetic expressions, distribution constraints, including distribution weights, solve before constraints, static and dynamic arrays, etc. In this way, verification process 10 may be configured to support real variables/values in situations where integral values are allowed.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design verification comprising:
   providing, using one or more processors, an electronic design associated with an electronic design automation tool, the electronic design having at least one floating point variable associated therewith;
   converting the at least one floating point variable of the electronic design to a fixed point variable to generate a fixed point implementation of the electronic design;
   processing, using a formal engine, the fixed point implementation of the electronic design; and
   automatically adjusting the fixed-point implementation based upon, at least in part, the at least one floating point variable.

2. The computer-implemented method of claim 1, wherein the formal engine is a Boolean satisfiability (SAT) engine.

3. The computer-implemented method of claim 1, wherein the formal engine is a Binary Decision Diagram (BDD) engine.

4. The computer-implemented method of claim 1, further comprising:
   converting at least one integer variable to an integer-converted fixed point variable.

5. The computer-implemented method of claim 4, wherein the fixed point implementation includes the integer-converted fixed point variable.

6. The computer-implemented method of claim 1, wherein the fixed-point implementation is user-configurable.

7. A non-transitory computer-readable storage medium for electronic design verification, the computer-readable storage medium having stored thereon instructions that when executed by a machine result in the following operations:
   providing, using one or more processors, an electronic design associated with an electronic design automation tool, the electronic design having at least one floating point variable associated therewith;
   converting the at least one floating point variable of the electronic design to a fixed point variable to generate a fixed point implementation of the electronic design; and
   processing, using a formal engine, the fixed point implementation of the electronic design; and
   automatically adjusting the fixed-point implementation based upon, at least in part, the at least one floating point variable.

8. The computer-readable storage medium of claim 7, wherein the formal engine is a Boolean satisfiability (SAT) engine.

9. The computer-readable storage medium of claim 7, wherein the formal engine is a Binary Decision Diagram (BDD) engine.

10. The computer-readable storage medium of claim 7, further comprising:
    converting at least one integer variable to an integer-converted fixed point variable.

11. The computer-readable storage medium of claim 10, wherein the fixed point implementation includes the integer-converted fixed point variable.

12. The computer-readable storage medium of claim 7, wherein the fixed-point implementation is user-configurable.

13. A system for electronic design verification comprising:
    a computing device having at least one processor configured to simulate an electronic design, the at least one processor further configured to receive, using one or more processors, an electronic design associated with an electronic design automation tool, the electronic design having at least one floating point variable associated therewith, the one or more processors further configured to convert the at least one floating point variable of the electronic design to a fixed point variable to generate a fixed point implementation of the electronic design, the one or more processors further configured to process, using a formal engine, the fixed point implementation of the electronic design, the one or more processors further configured to automatically adjust the fixed-point implementation based upon, at least in part, the at least one floating point variable.

14. The system of claim 13, wherein the formal engine is a Boolean satisfiability (SAT) engine.

15. The system of claim 13, wherein the formal engine is a Binary Decision Diagram (BDD) engine.

16. The system of claim 13, further comprising:
    converting at least one integer variable to an integer-converted fixed point variable.

17. The system of claim 16, wherein the fixed point implementation includes the integer-converted fixed point variable.

18. The system of claim 13, wherein the fixed-point implementation is user-configurable.

* * * * *